United States Patent
Soncini

(10) Patent No.: US 9,386,780 B2
(45) Date of Patent: Jul. 12, 2016

(54) STRUCTURE FOR HANGING MEAT SUCH AS BELLY AND/OR PIECES OF BACON

(71) Applicant: Stefano Soncini, Medesano (IT)

(72) Inventor: Stefano Soncini, Medesano (IT)

(73) Assignee: TECSAL S.P.A., Medesano (PR) (IT)

( * ) Notice: Subject to any disclaimer, the term of this patent is extended or adjusted under 35 U.S.C. 154(b) by 0 days.

(21) Appl. No.: 14/446,990

(22) Filed: Jul. 30, 2014

(65) Prior Publication Data

US 2016/0029649 A1 Feb. 4, 2016

(51) Int. Cl.
*A22C 15/00* (2006.01)
*A22C 17/02* (2006.01)

(52) U.S. Cl.
CPC .............. *A22C 15/003* (2013.01); *A22C 15/005* (2013.01); *A22C 17/02* (2013.01)

(58) Field of Classification Search
USPC .......................................... 452/185, 187, 193
See application file for complete search history.

(56) References Cited

U.S. PATENT DOCUMENTS

| | | | | |
|---|---|---|---|---|
| 891,307 A * | 6/1908 | Walsh | ........................... | 452/193 |
| 974,200 A * | 11/1910 | Stark et al. | .................... | 452/193 |
| 998,286 A * | 7/1911 | Fisher | ........................... | 452/193 |
| 1,006,007 A * | 10/1911 | Rispel | ........................... | 452/193 |
| 1,177,188 A * | 3/1916 | Keller | ........................... | 452/193 |
| 1,572,178 A * | 2/1926 | Bermond | ...................... | 452/193 |
| 1,742,872 A * | 1/1930 | O'Brien | ........................ | 426/315 |
| 1,915,293 A * | 6/1933 | Covey | ........................... | 452/193 |
| 2,011,127 A * | 8/1935 | Tait et al. | ...................... | 452/193 |
| 3,090,990 A * | 5/1963 | Graper | ........................... | 452/193 |
| 7,628,684 B2 * | 12/2009 | Jagusch | ........................ | 452/193 |
| 2006/0137537 A1 * | 6/2006 | Christensen | .................... | 99/348 |

* cited by examiner

*Primary Examiner* — David Parsley
(74) *Attorney, Agent, or Firm* — Young & Thompson

(57) ABSTRACT

A support hook for moving meat, more specifically for pieces or cubes of bacon/belly during the processing and/or curing thereof includes a framework and a plurality of tips. The plurality of tips are integral with the respective framework via respective heads arranged on both sides and the holes of the framework such that each tip can be inserted and interchanged even at a later time, if any tip should be broken or chipped. This type of hook is generally called comb or bacon comb.

5 Claims, 4 Drawing Sheets

STRUCTURE FOR HANGING MEAT SUCH AS BELLY AND/OR PIECES OF BACON

FIELD OF APPLICATION OF THE INVENTION

The present invention refers to a support hook for moving meat, more specifically for pieces or cubes of bacon/belly during the processing and/or curing thereof.

The meat is first treated with salt, sugars, preservatives (nitrates and/or nitrites) and often spices, for a period of several days, as a function of the size of the piece.

Subsequently, the bacon can be further cured, or smoked.

STATE OF THE ART

Generally, the cuts of meat for bacon are processed and moved via suspension, on suitable hooks, for a predetermined time period and in a suitable processing zone.

The hooks for bacon and belly known up to now are devices comprising a plurality of pointed prongs or tips arranged on a same plane, like a comb, mounted on a suitably-shaped base framework in order to engage an elevated rail or the like.

Generally, the hooks are constructed in a manner such that the teeth or prongs can be easily inserted in the relatively softer zone of the meat along the upper ends; it is sufficient to press the prongs into the same zone.

Also known are monolithic structures, hooks constituted by a single solid piece of material from which a corresponding plurality of prongs are obtained via forging, such prongs spaced for the insertion in pork belly during movement and/or transformation.

DESCRIPTION AND ADVANTAGES OF THE FINDING

A general object of the present invention is to provide an improved structure for handling meat, in particular pork belly and/or bacon, during the slaughtering and subsequent handling and processing operations.

A further object of the invention is to obtain an improved structure for hanging meat, having the teeth independent and interchangeable with each other, also with respect to the support hook or element.

Another object of the invention is to obtain a structure that is inexpensive and at the same time resistant.

Said objects and advantages are all achieved by the structure for hanging meat such as belly and/or pieces of bacon, object of the present finding, which is characterized for that provided in the below-reported claims.

BRIEF DESCRIPTION OF THE FIGURES

This and other characteristics will be clearer from the following description of several embodiments that are illustrated, as merely non-limiting example, in the enclosed set of drawings.

FIRST EMBODIMENT

Figure 1:
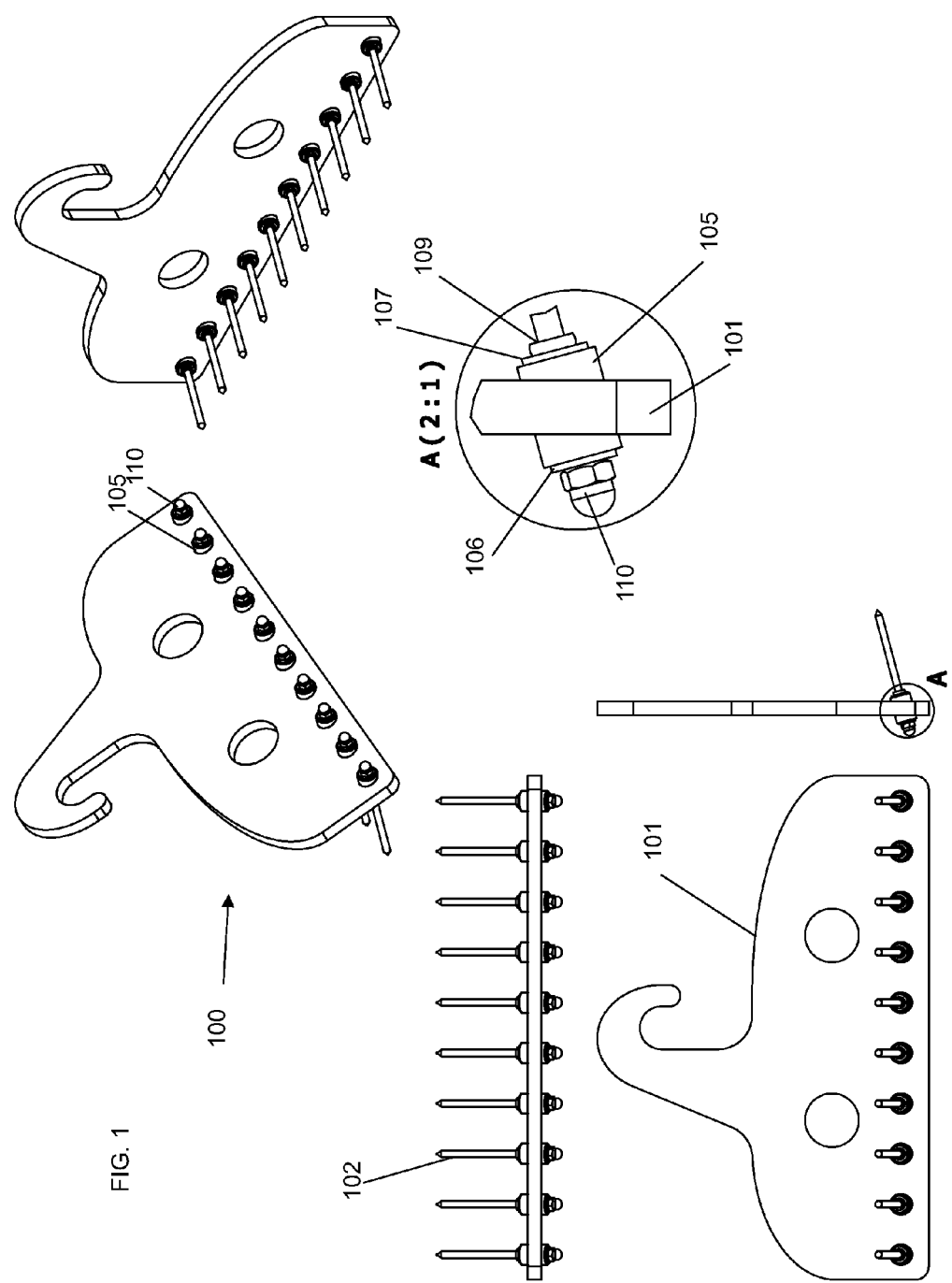
FIG. 1: illustrates a structure for hanging meat such as belly and/or pieces of bacon, according to a first embodiment.
Figure 2:
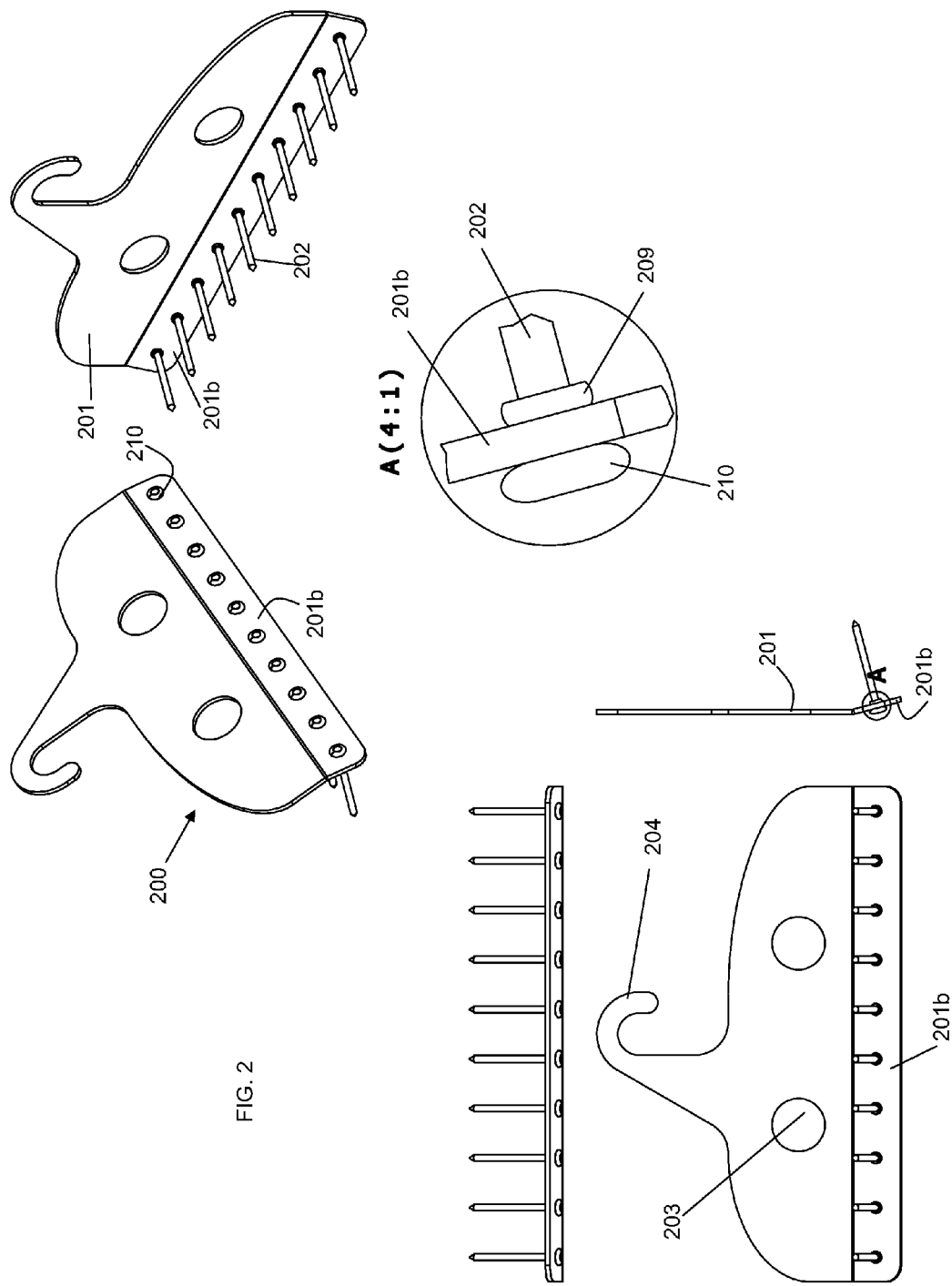
FIG. 2: illustrates a structure for hanging meat such as belly and/or pieces of bacon, according to a second embodiment.

With particular reference to FIG. 1, a first embodiment is illustrated of a support hook for processing meat, in particular belly or bacon.

It is indicated overall with the reference number 100.

The hook 100 is essentially constituted by a base framework 101 adapted to support a series of tips 102.

A part 103 of the framework 101 acts as a grip for grasping the hook 100.

The tips 102 are all directed in the same sense.

A curved portion 104 is hook-shaped in a manner such that it is suitable to hook with a guideway, rod, rack or frame.

The framework 101 is coplanar and the tips 102 are all extended over a same portion 101b in a manner such that they are themselves coplanar.

Specifically, with reference to FIGS. 6 and 7, hubs 105 are obtained in the terminal portion 101b; such hubs 105 are provided with through hole 106 within which a relative tip 102 is inserted.

The hub 105, but above all the axis of the hole 106 adapted to receive the relative tip 102, is arranged at 75° with respect to the planar surface of the framework 101. In general, the above-indicated angle can be comprised in an interval between 60° and 80°.

The plurality of tips 102 are integral in the respective hole 106 and hence with the respective framework 101 by means of respective heads 109, 110 arranged on both sides of the framework 101 itself.

Each tip 102 is locked in the respective seat, i.e. the hole 106, by means of heads 109, 110 and these heads can be obtained with:

Cold or hot deformation processes. The object is to create a head 109 and a counter-head 110 on both sides of the hub 105.

An element or nut screwable on a corresponding threaded portion of one end of the tip 102 itself.

The combination of a threaded and screwable nut 110 and a riveting 109 obtained via plastic deformation of the tip itself.

Preferably, between said heads 109 and 110 and the relative face of the hub 105, respective washers 106 and 107 are interposed.

Each tip 102 can thus be inserted and interchanged even at a later time, if it should be broken or chipped.

SECOND EMBODIMENT

With particular reference to FIGS. 2, 8, 9, 10, and 11, a first embodiment is illustrated of a support hook for processing meat, in particular belly or bacon.

This is indicated overall with the reference number 200.

The hook 200 is essentially constituted by a base framework 201 adapted to support a series of tips 202.

A part 203 of the framework 201 acts as a grip for grasping hook 200.

The tips 202 are all directed in the same sense.

A curved portion 204 is hook-shaped in a manner such that it is suitable to hook with a guideway, rod, rack or frame.

The framework 201 is only partly coplanar, indeed its base portion 201b, portion 201b on which the tips 202 are inserted, is bent on one side by about 15°, generically between 10° and 25°.

The tips 202 are extended from the base in a manner such that they are all coplanar. The tips are inserted in holes 206. With reference to FIGS. 10 and 11, it is observed that the tips 202 are extended from said portion 201b in a manner so as to be perpendicular to the latter portion 201b, in turn bent.

As in the previous embodiment, each tip 202 is locked in the respective seat, i.e. the hole 206, by means of, for example, cold or hot deformation processes, riveting or clinching.

The object is still that of creating a head 209 and a counter-head 210 on both sides of the framework 201.

Each tip 202 can thus be inserted and interchanged even at a later time, if it should be broken or chipped.

For both embodiments, the frameworks 101, 201 are made of plastic material (nylon) or stainless steel, and the tips 102, 202 as well as made of stainless steel or plastic material.

In the two illustrated embodiments, the tips 102 and 202 are aligned with each other on a same line, thus arranged on a same level.

Figure 3:
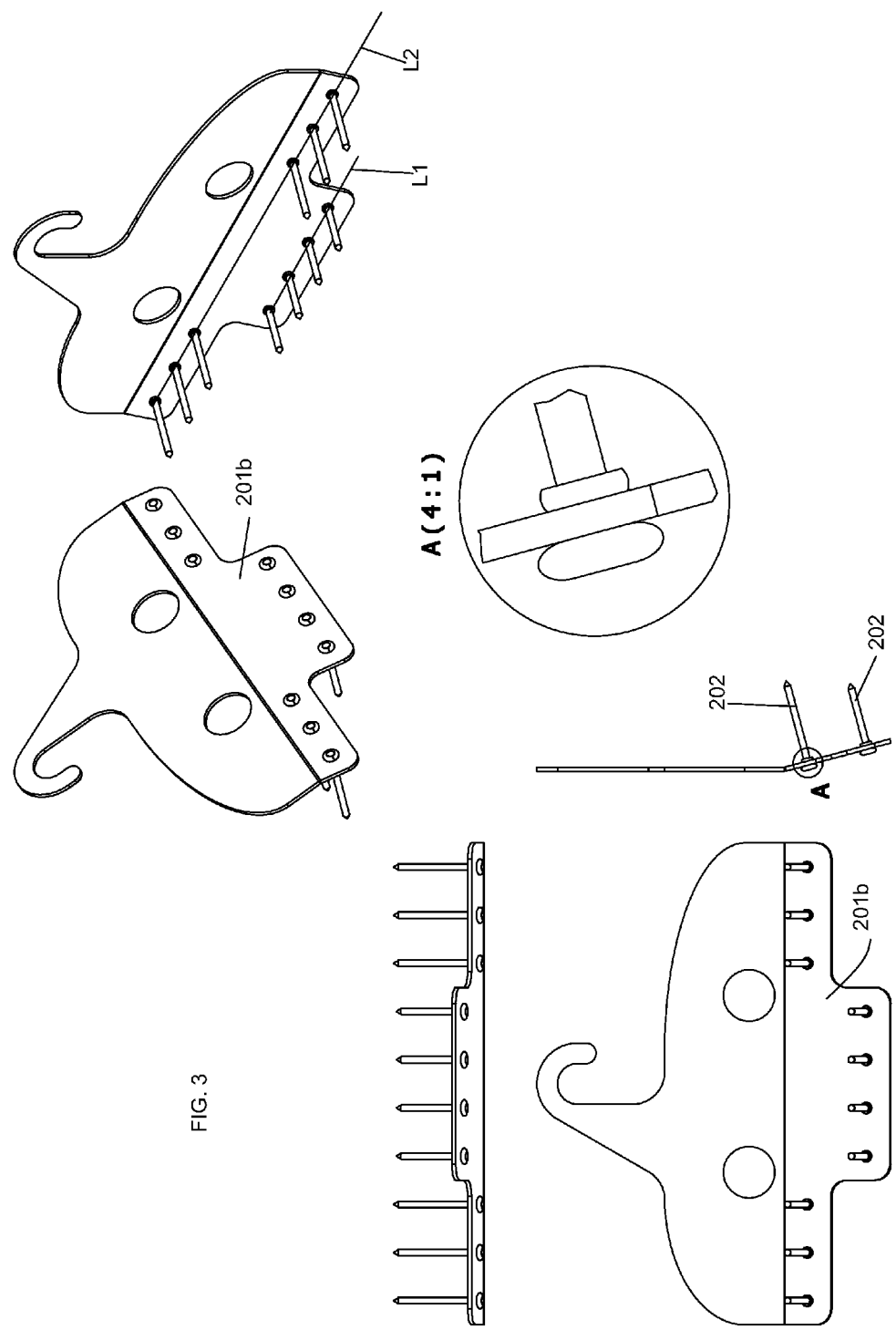
FIG. 3: illustrates a structure for hanging meat such as belly and/or pieces of bacon, object of the finding, with tips arranged on multiple different levels.
Figure 4:
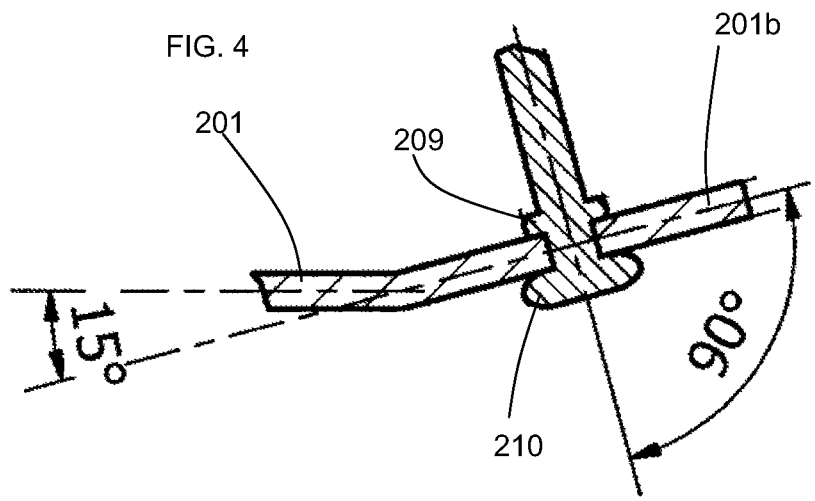
FIG. 4: a detail of the positioning of the tip with respect to the base of the hook, according to one embodiment.
Figure 5:
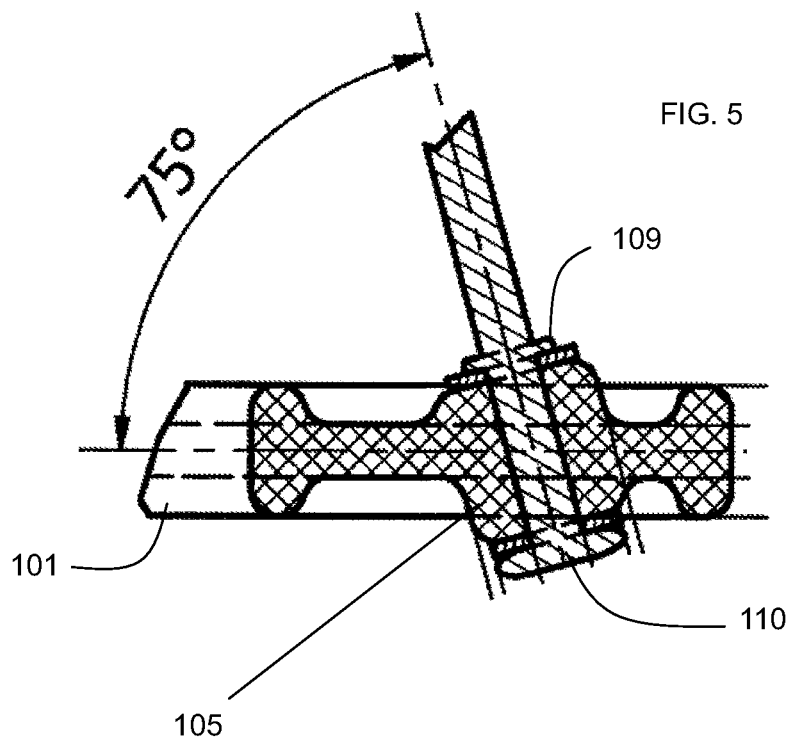
FIG. 5: a detail of the positioning of the tip with respect to the base of the hook, according to a further embodiment.

Without departing from the protective scope, as is also illustrated in FIG. 3, it is also possible to have a hook comprising a plurality of tips 102, 202 arranged on different levels L1 and L2, as illustrated.

In any case, it is intended that that described above has exemplifying and non-limiting value; therefore, possible detail variations that would be necessary for technical and/or functional reasons are considered henceforth falling within the same protective scope defined by the below-reported claims.

The invention claimed is:

1. A hook for supporting meat, including belly or bacon, comprising;
   a framework with i) a planar upper portion having a curved portion suitable to hook with a guideway, a rod, a rack or a frame and having one row of holes, and ii) an adjoining planar bottom portion having aligned plural holes that define two rows of holes, each of the two rows of holes being at different levels and vertically spaced on the bottom portion of the framework, the framework having a first side and an opposite second side, each hole being a through hole extend from the first side to the opposite second side,
   wherein an angle between a planar surface of the upper portion and a planar surface of the bottom portion is between 10° and 25°;
   a cylindrical hub at each hole, each hub having a first and second end, the hub extending through the framework such that the hub extends beyond the first and second sides of the framework;
   a first washer located on the first end of each hub and a second washer located on the second end of each hub;
   a tip passing through each hole with the first washer on the first end of the hub between the hub and the tip, each tip extending away from the first side of the framework and further through the first washer, the hub, and the second washer at each hole, each tip for use entering into the belly or the bacon; and
   a nut on a terminal end part of each tip on the second side of the framework with the second washer being between the second end of the hub and the nut.

2. The hook according to claim 1, wherein the angle between the planar surface of the upper portion and the planar surface of the bottom portion is between 10° and 15°.

3. The hook according to claim 1, wherein upper and bottom portions are stainless steel.

4. A hook for supporting belly and bacon, comprising;
   a stainless steel framework with i) a planar upper portion having a curved portion suitable to hook with a guideway, a rod, a rack or a frame, and ii) an adjoining planar bottom portion, the framework having a first side and an opposite second side, an angle between a planar surface of the upper portion and a planar surface of the bottom portion being between 10° and 25°;
   three rows of holes with one row of holes on the upper portion of the framework and two rows of holes on the bottom portion of the framework, each of the rows of holes on the bottom portion being on different levels and vertically spaced on the bottom portion of the framework;
   a plurality of tips, each tip having a threaded end portion extending through and being seated in and locked in a respective one of the holes in said framework and extending away from the first side of the framework;
   a first washer, a second washer, and a nut associated with each tip; and
   a cylindrical hub at each hole, each hub having a first and second end, each hub extending through the framework such that the hub extends beyond the first and second sides of the framework,
   wherein the first washer is on the first end of each hub between the hub and tip, and the second washer on the second end of each hub between the hub and the nut, each tip being removable from the framework by removal of the nut.

5. The hook according to claim 4, wherein the angle between the planar surface of the upper portion and the planar surface of the bottom portion is between 10° and 15°.

* * * * *